(12) United States Patent
Luedolph et al.

(10) Patent No.: US 10,073,001 B2
(45) Date of Patent: Sep. 11, 2018

(54) LEAK TEST ARRANGEMENT AND LEAK TEST METHOD

(71) Applicant: Luedolph Management GmbH, Langen (DE)

(72) Inventors: Gerald Luedolph, Langen (DE); Wolfgang Fuhrmann, Lilienthal (DE)

(73) Assignee: Luedolph Management GmbH, Langen (DE)

( * ) Notice: Subject to any disclaimer, the term of this patent is extended or adjusted under 35 U.S.C. 154(b) by 352 days.

(21) Appl. No.: 14/787,304

(22) PCT Filed: May 5, 2014

(86) PCT No.: PCT/DE2014/100156
§ 371 (c)(1),
(2) Date: Oct. 27, 2015

(87) PCT Pub. No.: WO2014/180469
PCT Pub. Date: Nov. 13, 2014

(65) Prior Publication Data
US 2016/0116365 A1  Apr. 28, 2016

(30) Foreign Application Priority Data

May 7, 2013 (DE) .................. 10 2013 104 682
May 7, 2013 (EP) ..................... 13166770

(51) Int. Cl.
*G01M 3/20* (2006.01)
(52) U.S. Cl.
CPC .............. *G01M 3/202* (2013.01); *G01M 3/20* (2013.01)
(58) Field of Classification Search
CPC ................................ G01M 3/202; G01M 3/20
(Continued)

(56) References Cited

U.S. PATENT DOCUMENTS 3,186,214 A  6/1965 Roberts
3,729,984 A  5/1973 Waldherr
(Continued)

FOREIGN PATENT DOCUMENTS

DE  4320363 A1  12/1994

OTHER PUBLICATIONS

International Search Report in International Application No. PCT/DE2014/100156, dated Jul. 30, 2014.

*Primary Examiner* — Hezron E Williams
*Assistant Examiner* — Marrit Eyassu
(74) *Attorney, Agent, or Firm* — Patent Central LLC; Stephan A. Pendorf

(57) ABSTRACT

A leak test arrangement (1) for testing a structural component (2) or a closed package/object (2"+21", 2"*) with a wall to be tested for tightness, including: a test chamber (3) in which the structural component (2) or the package/the object (2"+21", 2") is arranged during the leak testing, a test gas space (4) which is formed on a first side of the wall of the structural component (2) and of the test chamber (3) or which corresponds to the interior of the package/of the object (2", 2"*), a testing space (5) which is formed on a second side of the wall of the structural component (2) and of the test chamber (3) or is formed between the wall of the package/object (2"+21", 2"*) and the test chamber (3), a test gas supply (6) for supplying compressed air (DL) and/or a test gas (TG) into the testing space (5), a test gas measuring arrangement (7) for measuring or detecting the test gas (TG) in the testing space (5) with a sensor system (72) and a testing space vacuum arrangement (51) for evacuating the testing space (5). The invention further relates to a leak test method for testing a structural component (2) or a closed package/an object (2"+21", 2"*) with a leak test arrangement (1) according to the invention.

8 Claims, 4 Drawing Sheets

(58) Field of Classification Search
USPC .......................................................... 73/40.7
See application file for complete search history.

(56) References Cited

U.S. PATENT DOCUMENTS

| | | | |
|---|---|---|---|
| 3,762,212 A | 10/1973 | Morley et al. | |
| 3,824,839 A | 7/1974 | Briggs | |
| 4,611,602 A * | 9/1986 | Bolduc | A61B 17/42 |
| | | | 600/560 |
| 4,813,268 A * | 3/1989 | Helvey | G01M 3/205 |
| | | | 73/40.7 |
| 5,553,483 A * | 9/1996 | Armentrout | G01M 3/229 |
| | | | 73/40 |
| 5,850,036 A | 12/1998 | Giromini et al. | |
| 5,939,619 A * | 8/1999 | Achter | G01M 3/229 |
| | | | 73/40.7 |
| 6,629,043 B1 * | 9/2003 | Poteat | G01M 3/202 |
| | | | 702/51 |
| 2006/0230816 A1 * | 10/2006 | Buerkle | G01M 3/20 |
| | | | 73/40.7 |
| 2009/0277249 A1 * | 11/2009 | Polster | G01M 3/229 |
| | | | 73/40.7 |

\* cited by examiner

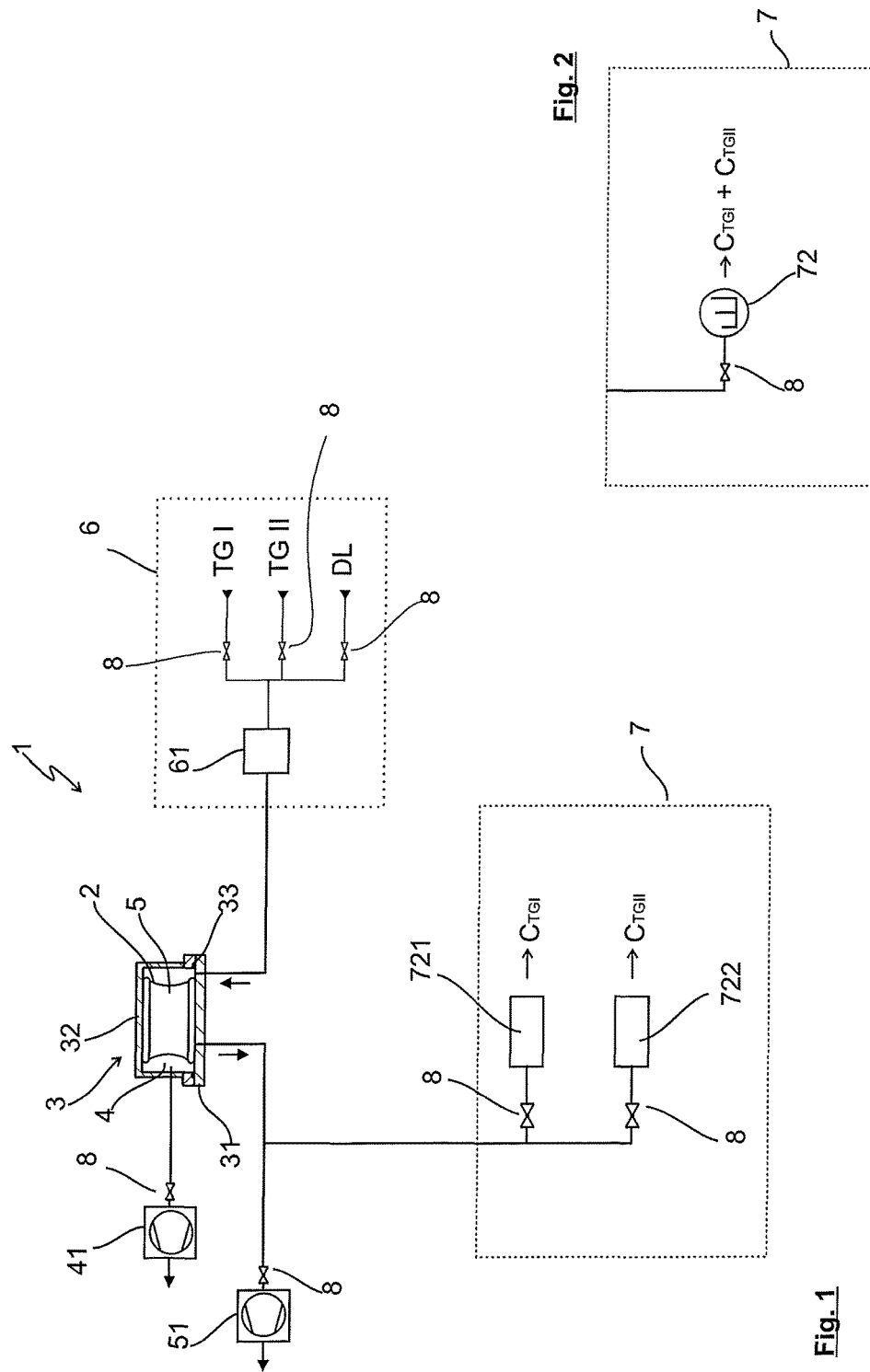

LEAK TEST ARRANGEMENT AND LEAK TEST METHOD

The invention relates to a leak test arrangement for testing a structural component or a closed package or a closed object or component with a wall to be tested for tightness, comprising: a test chamber in which the structural component or the packaging, the closed object or component is arranged during leak testing, a test gas space, which is formed between a first side of the wall of the structural component and of the test chamber or which corresponds to the interior of the package/of the object, a testing space, which is formed on a second side of the wall of the structural component and the test chamber or is formed between the wall or cover of the package/object and the test chamber, a test gas supply for supplying compressed air and/or a test gas into the test gas space, a test gas measuring arrangement for measuring or detecting the test gas in the testing space with a sensor system and a testing space vacuum arrangement for evacuating the testing space.

The invention further relates to a leak test method for testing a structural component or a closed package or close object or component with a leak test arrangement according to the invention.

A leak test in terms of physics is a measurement of the leak rate, wherein below a predetermined leakage rate the tightness of an object to be tested is satisfactory and above a predetermined leakage rate of the object to be leak tested it is not satisfactory.

Different leak test arrangements are known from the prior art to carry out an industrial leak testing of structural components having a first side and a second side, wherein the tightness is to be checked between the first side and the second side. Such industrial leak tests are carried out in mass production of automobile wheel rims, especially aluminum rims, cooling lines, pressure and vacuum lines, heat exchangers, such as radiators and the like, pump housings, shock absorbers and spring struts and vibration absorbers, fuel tanks, valves, motors, fittings, bulbs and the like, as well as in the pharmaceutical industry for blister packs, sprays bottles or long-term drug packaging. The application examples listed above are not to be considered exhaustive. In particular, a very large segment of the leak testing is the field of aerospace components-testing, wherein the most diverse components can be tested for leaks.

In the area of industrial leak testing for aluminum wheels, a tightness test of the aluminum wheels is virtually without exception carried out in appropriate leak test arrangements by a mass spectrometer with helium as the test gas. For the leak test of an automobile wheel rim the test piece is fed via a conveyor system from the production side to a leak test arrangement and a handling system positions the specimen within a test chamber of the leak test arrangement.

After proper positioning of the automobile wheel rim, which can also include steel rims or novel carbon rims, is sealed in such a way, that the wall between the interior and exterior of the automobile wheel rim, that is, the partition or receiving the tire to be mounted later, can be tested for leaks. Next, the spaces both on the inside and on the outside of the automobile wheel rim are evacuated.

The pressurization is carried out with a test gas on one side of the automobile wheel, preferably the outer side, wherein on the other side, the vacuum is maintained, and after reaching the predetermined pressure a valve unit is opened, so that a gas sample can be removed from the interior of the automobile wheel rim, which is examined to see whether the test gas has penetrated through the wall and thus the test gas is detectable on the vacuum side. This test is performed by a mass spectrometer, wherein the sample is examined as to defined amounts of helium, which would indicate a possibly existing leak in the wall of the automobile wheel rim.

Using a predetermined threshold value, the automobile wheel rims are sorted into those which have the necessary tightness and those which have leaks.

After tightness measurements are conducted the test gas helium is depressurized, recovered and all testing spaces are ventilated. Subsequently, the test chamber is opened and a changing of the wheel is performed automatically.

Document U.S. Pat. No. 3,762,212 A discloses a leak test arrangement, wherein a leak test is carried out using a test gas which is matched to a mass spectrometer provided in the system, preferably using helium as a test gas, however, other test gases can be used, and these pure test gases are preferably mixed with air.

The document U.S. Pat. No. 3,729,984 A discloses a leak test arrangement for container.

Furthermore, from the document U.S. Pat. No. 3,186,214 A a leak test arrangement known in which a test gas and compressed air are successively introduced into the test gas space.

From the document U.S. Pat. No. 5,850,036 A a wheel leak test arrangement is known, in which a check is carried out by means of a mixture of helium and air, and is correspondingly evaluated by means of a helium mass spectrometer.

Furthermore, document DE 43 20 363 A1 discloses a leak test arrangement, wherein the air is taken as a test gas and separated in a separator prior to use and single components are removed before the remaining components are used for pressurizing with test gas.

Document U.S. Pat. No. 4,813,268 A discloses a leak detection system with a test chamber in which a wheel is checked for tightness, with helium is introduced as the test gas into a helium chamber and leakage measurement is performed on the other side of the wheel being tested for leakage by means of a vacuum device and a mass spectrometer, wherein the vacuum performance of a single vacuum arrangement is distributed via a main vacuum line and a vacuum manifold and the vacuum supply to the areas to be evacuated is controlled via individual valves, and the vacuum power is used in such a manner that first an evacuation of the test chamber is carried out via the main vacuum line and vacuum manifold and subsequently a further evacuation is made of the test chamber via the vacuum manifold on the upper side, wherein upon achieving a defined vacuum level for measuring the tightness a sampling valve to the mass spectrometer is opened.

Document U.S. Pat. No. 3,824,839 A discloses a leak detection system for open or sealed vessels in which a leak test is to be carried out by means of a test gas and a mass spectrometer, wherein several valves span different sized spaces between the test chamber and the detection device, whereby test gas quantity supplied to the mass spectrometer becomes limited.

A problem in the conventional leak test arrangements for testing structural members and sealed packages, as well as closed components, for leaks, involves test gas contamination of the leak test arrangement resulting from a leaky structural component or a mixed operation with different sizes of elements to be inspected for tightness.

Test gas contamination through a leak in the structural component leads, considering the sensitive mass spectrometer test methods, to significant test delays or to faulty or incorrect measurements, in particular to a false reject rate and seems generally not to be unavoidable.

The false rejection, namely of components, structural members, etc. which are completely intact, but on the basis of a test gas contamination are rejected, must either be checked again, which is time and labor consuming, resulting in a significant delay, or be destroyed in accordance with the manufacturer's protocol, which in turn leads to an economic disadvantage since a test gas leak detection of contamination is not necessarily eliminated after one more examination.

The present invention is based on the object of providing a leak test arrangement and a tightness test method that makes it possible to considerably reduce the false reject rate of tested components, and in this way to increase the efficiency of a leak test arrangement.

This object is achieved with a leak test arrangement according to claim 1 and a tightness test method according to claim 4.

The sensor system includes a mass spectrometer, a quadrupole mass spectrometer and/or at least two single test gas sensors, wherein the sensor system of the test gas measuring arrangement can detect at least two test gases, and the test gas supply can deliver at least two different test gases, where either the first test gas, the second test gas or a combination of the first and the second test gas can be introduced into the test gas space. This novel configuration of a leak test arrangement makes it possible to operate the system with two different test gases, which are both detected.

In the event of contamination another test gas would be used in the next process, which will therefore not lead to a false rejection of the tested structural component. Thus, the structural component can be tested without false rejection and thus only actually leaking components will be identified as NIO, not-in-in order, and accordingly destroyed, reworked or the like, resulting in huge cost savings in manufacturing, either because only precisely the required number of elements are produced, or the actual production rate is higher, namely increased by elimination of false rejects.

In a simple embodiment, simple sensors for detecting the test gases or their concentration in the air may be used. Preferred however, is the use of sensor systems, which can detect two or more test gases.

A mixing assembly is provided for mixing the test gas(es) with compressed air prior to or in the test gas space, wherein in the mixing arrangement includes means for homogeneous mixture of the test gas with the compressed air, wherein the test gas supply comprises at least three individual introduction means, which penetrate directly into the test gas space or are provided there, wherein a first introduction means can be pressurized with compressed air, a second introduction means can be pressurized with a first test gas and a third introduction means can be pressurized with a second test gas.

This results on the one hand in an optimal mixing of the test gas air mixture within the test gas space and on the other hand a very good control and dosing of the test gas quantity. In particular, the filling can be dosed very precisely during the test and in addition dynamically, so that even with a small test gas pressure a sensitive gross leak measurement can be made, whereby a test gas contamination at a very high test gas pressure can be avoided. The mixing ratio of test gas to compressed air is about a factor of 100 to 1000 less than the previous mixing ratio of conventionally available leak test arrangements, so that the consumption of expensive test gas can be greatly reduced.

In this regard a first early test gas measurement can be made taking a small sample at the beginning of the test gas mixing process, so that the sensor system, for example a quadrupole mass spectrometer, can detect at an early stage, a moderate leakage. If a leakage is detected already at the beginning of the general leakage measurement, the remaining testing procedure can be stopped immediately, whereby the test gas is saved.

If a test gas contamination of leak test arrangement occurs due to a leaky structural component, then for the next measurement the second test gas is switched to by appropriately controlled control valves, which can then in turn be detected by the sensor system, due to its broad measuring range. The use of the second test gas takes place only until the contamination can no longer be detected with the first test gas in the background. This can for example be particularly relevant if one uses a first working test gas and a second more expensive test gas.

The test gas supply according to the invention can be sourced from least two different test gases, where either the first test gas, the second test gas or a combination of the first and the second test gas is available, wherein the test gas is preferably hydrogen ($H^2$), particularly preferably a forming gas, helium (He) and/or carbon dioxide ($CO^2$). Here, the simple and inexpensive availability is the most important and decisive aspect. Of course, other gases may be used. It should also be noted that no problems exist in relation to the use of forming gas on a potential explosion hazard. Within a compressed air test gas mixture based on forming gas, the hydrogen concentration can be kept low due to the use of a quadrupole mass spectrometer, so that no problems arise from the use of forming gas.

The sensor system includes a mass spectrometer, particularly a quadrupole mass spectrometer and/or at least two single test gas sensors, wherein in a particularly preferred embodiment the sensor system of the test gas measuring arrangement can detect at least two test gases.

A quadrupole mass spectrometer is a "partial pressure measuring device" for medium vacuum, high vacuum and ultra-high vacuum and is available in a cost-effective variant as a residual gas analyzer. Quadrupole mass spectrometers are a common type of mass spectrometer, since the device can be compact and inexpensive. Quadrupoled are also fast enough to be able to perform a quick residual gas analysis. Especially in automated leak testing, the time factor is of particular importance.

The quadrupole mass spectrometer provides for these tasks a good compromise between performance, space requirements and cost, since the properties, such as the simple way of scanning over the entire mass range, high sensitivity, high measurement and repetition rate and the large measuring range and compatibility with the general vacuum technical requirements such as small dimensions, any mounting position and low self-off-gassing, are especially appreciated.

Further, a test gas space preparation system for preparation of the test gas space or headspace for receiving compressed air and/or test gas is provided, wherein the test gas space preparation arrangement is a test gas space vacuum arrangement for evacuating the test gas space in the event of a leak test of a structural component or is preparation section, preferably with a controlled atmosphere, in the case that the unit being tested is a closed packaging/object.

The leak test method for sequentially performed successive tests of a plurality of structural components or packages/objects with an inventive leak test arrangement, wherein a test gas is introduced into the test gas space to check for leaks and a detection for that test gas is carried out in the testing space, wherein:

a) upon detection of the test gas in the testing space the tested structural component or packaging/object indicates a leak (NIO);

or b) in the absence of detection of the test gas in the testing space the tested structural component or packaging/object does not indicate a leak (IO);

includes in time overlap with, before and/or after the leak test a detection/evaluation of the testing space for contamination by the test gas, wherein in the event of contamination of the testing space or the detection of a leak, a switch is made from a preferred test gas to a replacement gas test for the next leak test measurement to be performed.

In time overlap with, before and/or after the leak test a detection/evaluation of contamination of the test chamber by the preferred test gas takes place, wherein in the case that no contamination of the test chamber is present any longer, a switching from the replacement test gas to the preferred test gas is made for the next performed leak test measurement.

Next there occurs in time overlap with, before and/or after the leak test a detection/evaluation of the test chamber for contamination by the replacement test gas and, in case of contamination of the test chamber or a detected leak, a flushing the test chamber and/or the test chamber with air and employment of the preferred test gas in the next leak test to be performed occurs.

Before the introduction of the test gas a detection of testing space for contamination with the test gas is carried out, in which for this a check is made for the presence of the test gas prior to introducing the test gas to the testing space and in the event of detection of the test gas a switch is made to the other test gas for the current leak test process.

If a contamination of the test chamber with one of the test gases occurred, then a switch is made to the other test gas. If a contamination with other test gas is present and the contamination with the first test gas is not yet fully dissipated, so according to the invention a flushing of the test chamber with air is carried out and a switch is made to the preferred test gas.

Another developed partial object of the invention is to reduce to test gas used to perform the leak test, so that the test gas consumption is reduced, thereby further substantial economic benefits arise. This object can be seen in particular in comparison to the previous versions.

The fact that the test gas measurement arrangement includes, between the test chamber and the sensor system, a sample stage with an intermediate chamber, a testing space-side valve arranged between the intermediate chamber and the testing space, a sensor system-side valve arranged between the intermediate chamber and the sensor system, a vacuum arrangement connected to the intermediate chamber for evacuating the intermediate chamber and a vacuum arrangement-side valve arranged between the intermediate chamber and the vacuum arrangement, it is firstly possible to use a highly sensitive measuring instrument for testing gas detection as a sensor system and, secondly, to reduce the time required for the measurement process, since the measurements can be continued, even though the test chamber has been again pressure-normalized and ventilated, whereby overall test gas consumption is significantly reduced compared to the prior art and the cycle times are the same or even can be reduced despite a much more sensitive measurement, which ultimately results in a higher output.

By means of the chambers or sample portions being series-connected and having decreasing pressures in the direction of the sensor system, and an associated method for actuation of the corresponding valves, it is possible, using the differential pressures forming between the stages connected in series, to supplying the gas samples to the highly sensitive sensor system. In the case of series-connected stages, a reduction of the pressures by several decades or tens occurs, so that from the initial pressure of the testing space, namely a very subtile vacuum in the range of 1 to $10^{-3}$ mbar, via the high vacuum in the range of $10^{-3}$ to $10^{-6}$ mbar inside the sample stage, up to a high to ultra-high vacuum in the range of $10^{-4}$ mbar to $10^{-7}$ mbar, the pressure decreases from the testing space, without changing the sample composition significantly.

In addition, using this leak test arrangement a rapid measurement is possible, wherein immediately after the first gas sampling in the intermediate chamber, the test chamber can be relaxed and ventilated and a new structural component or a closed package or component may be introduced for testing.

The measurement sensitivity of leak test arrangement is increased by a factor of 1,000 due to the availability of better sensor systems, which means that only about one hundredth or up to one thousandth of the originally required test gas quantity is needed for the implementation of the leakage test. Quadrupole mass spectrometers in particular may be considered, wherein also comparable spectrometers and sensors may be used.

The volume of the intermediate chamber correlates with the size of the testing space, wherein the volume of the intermediate chamber is in the range of 1 to 1,000 $cm^3$, especially in the range of 1 to 150 $cm^3$. The size of the intermediate chamber is adapted in accordance with the conditions, in order to realize the minimum necessary cycle time, wherein the intermediate chamber should not be too big but also not too small. In particular, when determining the size, the leakage rate, the cycle time and the pressure relationships play an important role.

By this in hindsight quite simple construction and connection of a quadrupole mass spectrometer to a sample stage by means of the differential pressure method the test gas consumption can now be significantly reduced, since the detection sensitivity is increased dramatically, whereby the total costs necessary for the provision of helium as a test gas can be reduced by a factor of 100 to 1,000.

The special aspect, as to why this combination of sample stage and quadrupole mass spectrometer is generally applicable here, is the non-alteration of the gas composition. The gas which is extracted from the testing space of the test chamber of the leak test arrangement is not changed in gas composition, but is significantly reduced only in its pressure and supplied to the quadrupole mass spectrometer for analysis.

In a preferred embodiment, all vacuum/pressure lines are kept very short, in order thereby to keep process times very short. Of course, the volumes of the valves and lines are to be taken into consideration. The vacuum arrangement is a diaphragm pump, a rotary vane pump, and/or a turbo molecular pump.

The vacuum for taking a sample via the pressure differential in a connection can be cost-effectively and highly efficiently implemented via a diaphragm pump, so the in the connection the gas sample originating from the test chamber changes in pressure but not in their composition, and is conveyed via the connection to the sensor system via the pressure differential, whereby the gas sample can then be analyzed in the sensor system.

Of course, the system can also be applied several times in succession to the sample stage, whereby a multi-stage pressure reduction takes place, but the gas composition does not change. In particular, in this way the problems of a conventional throttle, namely, problems due to contamination, the slow gas flow rate, and especially the changing gas composition of the sample taken, can be excluded.

Between the sensor system-side valve of the intermediate chamber and the sensor system at least one vacuum booster stage can in addition be arranged, wherein the pressure of the sample gas to be assayed in the sensor system of the test chamber is further reduced.

The leak test method for testing a structural component or a closed package or a closed object with a leak test arrangement described above comprises the steps of:

1) evacuating the intermediate chamber with closed testing space-side valve and sensor-side valve via the vacuum arrangement with open vacuum arrangement-side valve, wherein in time overlap the following occurs:

2A) in the case of the leak test of a wall of a structural component:
   a) positioning the structural component while the test chamber is open;
   b) closing the test chamber and sealing the structural component, so that a test gas space and a testing space are formed;
   c) evacuating the enclosure and the test gas space;
   d) mixing and introducing a mixed gas comprising compressed air and/or a test gas in the test gas space;
or
2B) in the case of leak testing a closed package/a closed object:
   a) preparing the test gas space by filling the interior of the closed packaging/object as a test gas space with compressed air and/or the test gas
   b) positioning the closed and compressed air and/or test gas filled packaging/object while the test chamber is open;
   c) closing the test chamber, so that the testing space is formed;
   d) evacuation of the testing space;

3) closing the vacuum arrangement-side valve and then drawing a sample from the testing space via the pressure drop of a portion the gas sample by briefly opening and then closing the testing space-side valve;

4) a) releasing part of or the gas sample located in the intermediate chamber of the test chamber to the sensor system via the pressure drop by opening the sensor system-side valve during the analyzing of the gas sample by the sensor system and assessment of the leak tightness of the structural component or the closed package/object; and
   b) in time overlap ventilating the test chamber for resupplying with the next structural component by removing the structural component or the closed packaging/object, wherein, preferably prior to the step 2A) d) or 2B) a), there is a detection of the testing space or test chamber as to contamination with a test gas takes place.

In particular, it is possible to draw short samples and to analyze them independently of the further filling of the test chamber.

The opening time of the testing space-side valve [Step 3] and/or the sensor system-side valve [Step 4) a)] by briefly opening and then closing is in the range 0.1 to 9 seconds, most preferably, the opening time of 0.5 to 2 seconds, because by this brief opening only a very limited amount of the gas sample is transferred by the pressure differential compensation.

After the method step 2A) c) or 2B) d) initially a closing the vacuum arrangement-side valve and then a pulling a sample from the testing space may be done by briefly opening and then closing the testing space-side valve [Step 3], wherein in the connection by releasing a portion of the gas sample or the gas sample located in the intermediate chamber of the test chamber by the pressure drop through opening of the sensor system-side valve of the sensor system above [step 4) a)], a gas analysis of the gas sample from the test chamber is made by the sensor system for contamination with the test gas from the previously conducted leak test, wherein upon the detection of a contamination of the testing space with the first test gas, a switchover of the test gas supply to a second test gas, or a combination of the first and second test gas, takes place. There is thus an investigation of the background, whereby also a calibration can be realized, which is always dependent on the current test atmosphere and can be taken into consideration in the evaluation of gas samples.

After changing the test gas following a test gas contamination of the test chamber, detection of the first test gas will continue, and when the first test gas again falls below a contamination limit, a switch is made back to the first test gas. Here, in particular, inexpensive test gases can be preferably used.

The mixing and introduction of the test gas and the compressed air in the test gas space can be carried out simultaneously from the beginning, or at different times. First, the compressed air and the test gas in the connection or in the last third of the compressed air inlet can be introduced into the test gas space. Here, it is important that during the test gas introduction the test gas is sufficiently well distributed within the test gas space. Preferably, the test gas is first introduced into a test specimen to be tested and only then is the compressed air in the connector added, so that a better mixing is effected in a to be tested specimen.

During the test for a test gas contamination, a calibration of the background in the enclosure could be made, wherein the further analysis of the testing space sample is carried out with respect to a leakage of the structural component taking account the calibration. As a result, the relative accuracy of testing is increased again significantly.

The compressed air is produced from the existing ambient air and is possible to use as the test gas in connection with a quadrupole mass spectrometer.

In the following exemplary embodiments of the invention are described in detail with reference to the accompanying drawings.

Therein:

FIG. 1 is a schematic representation of a first embodiment of the inventive leak test arrangement using as an example an aluminum wheel with a first variant of a test gas measuring arrangement;

FIG. 2 is a schematic representation of a further variant of the test gas measuring arrangement for detection according to the embodiment and the application example of FIG. 1;

Figure 5:
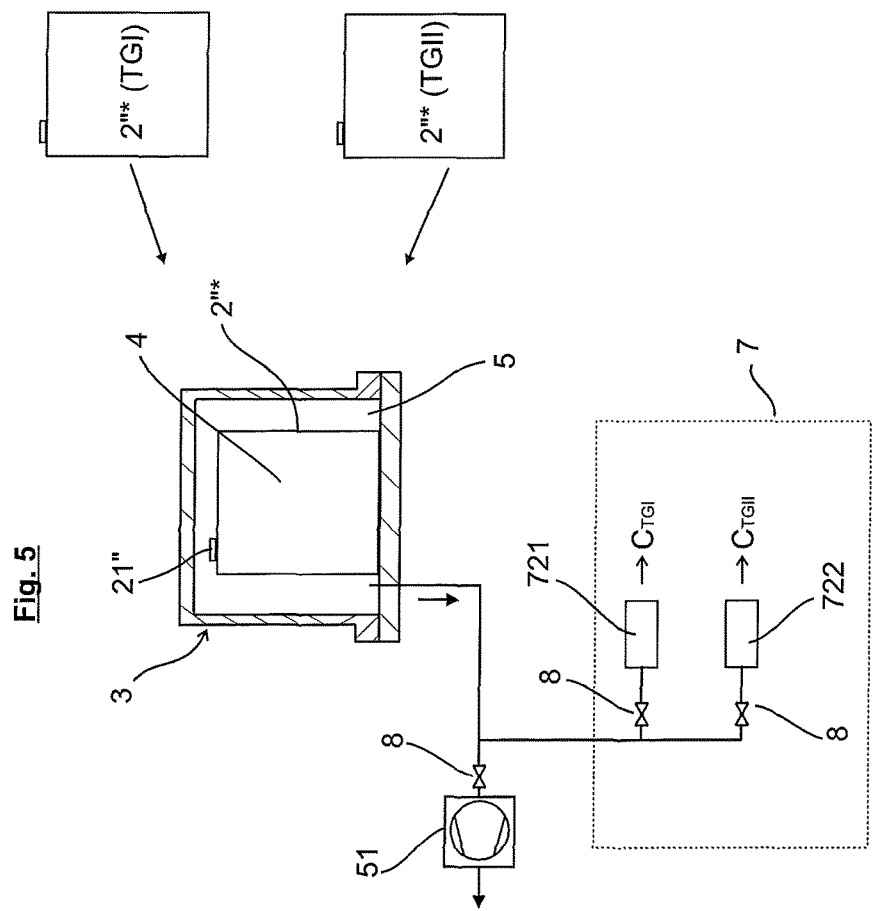
Figure 4:
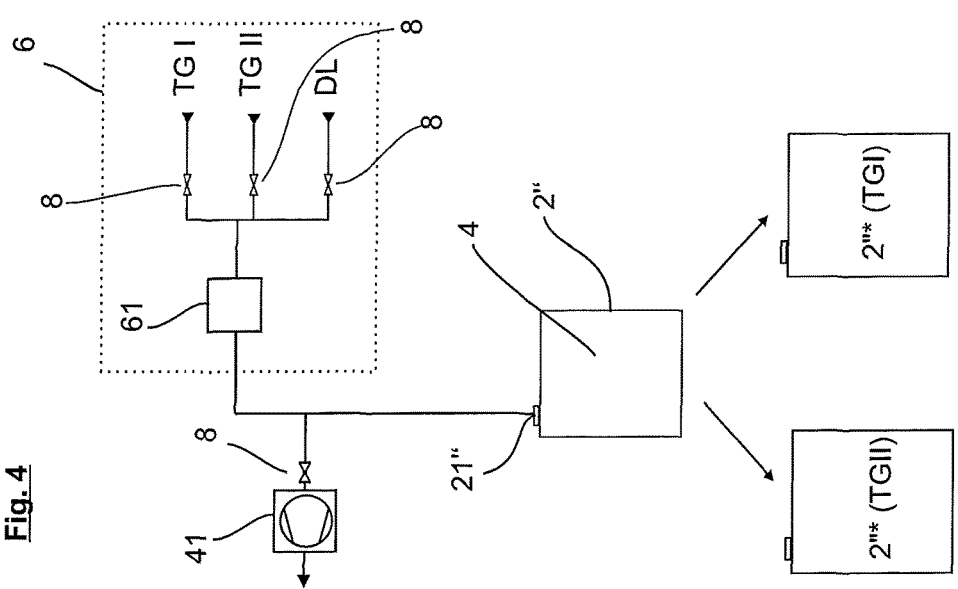
Figure 6:
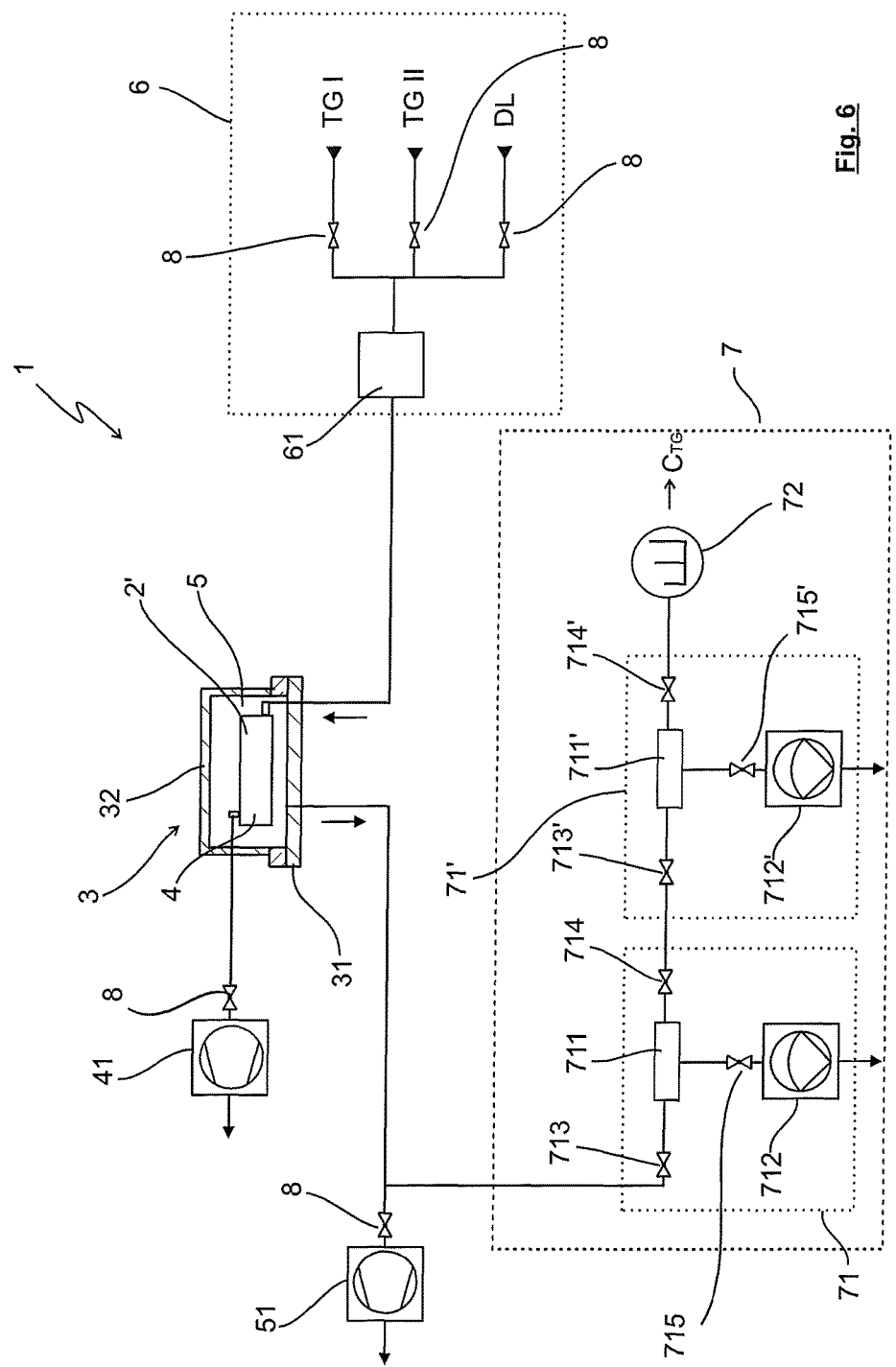

FIGS. 4 and 5 are a schematic representation of an embodiment and principle of application of the leak test arrangement according to the invention using the example of a drum, to be tested for leaks together with a lid associated with the specific drum, wherein drums are first filled with different test gases (FIG. 4) and then leak tested (FIG. 5), wherein the supplying of the drums to the plant is a function of a possible contamination; and FIG. 6 is a schematic illustration of a further embodiment and principle of application of the present inventive leak test arrangement using the example of a cooler or heat exchanger.

FIG. 1 is a schematic representation of a first embodiment of the inventive leak test arrangement 1 using the example of an aluminum wheel 2 with a first variant of a test gas measuring arrangement 7.

The leak test arrangement 1 consists of a test chamber 3, a test gas supply 6 and a test gas measuring arrangement 7. In addition, vacuum arrangements 41 and 51 are provided.

Within the test chamber 3, the structural component/the Smart Car wheel 2 is placed by automation onto a lower sealing plate 31. Following this, the test chamber 3 is closed by means of the upper sealing cover 32 which is placed on the lower sealing plate 31 and sealed with seals 33. Here, a test gas space 4 and a testing space 5 are formed. The test gas space 4 is realized between the test chamber 3 and the Smart Car wheel 2, and this essentially corresponds to the later placed onto the Smart Car wheel 2 tire rim. The testing space 5 is formed between the lower sealing plate 31 and the upper part of the upper sealing cover 32, and this corresponds to the interior of the Smart Car wheel 2. The tightness of the wall of the Smart Car wheels 2 being tested is thus limited on the one hand by the test chamber 5 and on the other side by the test gas space 4.

The test gas supply 6 comprises at least two test gas sources, namely first test gas TG I, for example, helium, and second test gas TG II, for example, hydrogen or carbon dioxide. Furthermore, the test gas supply 6 includes a compressed air supply DL. The compressed air and the test gas can either, as shown here, be premixed in a test gas/compressed air-gas mixing arrangement are 61 and introduced into the test gas space 4 already premixed or be mixed with one another only in the test gas space 4 by means of individual lines and corresponding nozzles, in which case mixing could occur dynamically, wherein in the event of an early leak detection an unnecessary further testing gas consumption could be avoided.

The test gas measuring arrangement 7 comprises two individual sensors for gas detection of specific gases, namely a first sensor 721 for detecting the first test gas TG I and a second sensor 722 for detecting the second test gas TG II.

Furthermore, other controllable valves 8 are provided in the overall arrangement.

At this point it should be noted that this is an abstracted schematic diagram of one embodiment of the inventive structure of a leak test arrangement 1, in which the well-known in the art necessary vacuum assemblies, namely particular test gas space or headspace vacuum arrangement 41 and testing space vacuum arrangement 51 are not described further in detail, are nevertheless designed correspondingly. For example, for this purpose identical or different vacuum pump types can cooperate or be connected in sequence, in order to be able to generate a vacuum as necessary or to evacuate the test gas space 4 and the testing space 5.

For leak testing, the automobile wheel rim 2 to be tested for tightness, which is located in the test chamber 3, there occurs initially, after the introduction of the Smart Car wheels 2 in the test chamber 3 and the closing of the test chamber 3, an evacuating of the test gas space 4 via the test gas space vacuum arrangement 41 and the testing space 5 via the testing space vacuum arrangement 51. The evacuation of the spaces continues approximately into the region of $10^{-1}$ mbar. Following the evacuation, a first test gas TG I is introduced in the test gas space 4 in combination with compressed air DL via the test gas supply 6.

Next a sample is removed from the test chamber 5, which is then evaluated by the sensors 721 and 722, or their concentration is detected.

Based on this leak test, a sorting of automobile wheel rims is carried out assigning the status "in order" if no leakage was found, and "not in order", if there has been a leak.

To avoid unnecessary delays, caused by a leakage of a Smart Car wheels 2 and the associated test gas contamination with the first test gas TG I within the test chamber 3, or to avoid a flushing of the test chamber 3, it is possible to switch to a second test gas TG II after a wheel change by corresponding valve switching and to carry out the next leak test immediately following the wheel change.

FIG. 2 is a schematic representation of a further variant of the test gas measuring arrangement for detection according to the embodiment and the application example of FIG. 1.

In contrast to the embodiment of FIG. 1, now test gas measuring arrangement 7 is fitted with a quaudrupole mass spectrometer 72, that can detect the concentration or, more specifically, the partial pressure of a number of gases, including the employed test gases TG I and TG II. The corresponding test gas concentration CTG, or test gas concentrations of both test gases, is output accordingly in the measurement and further processed.

Figure 3:
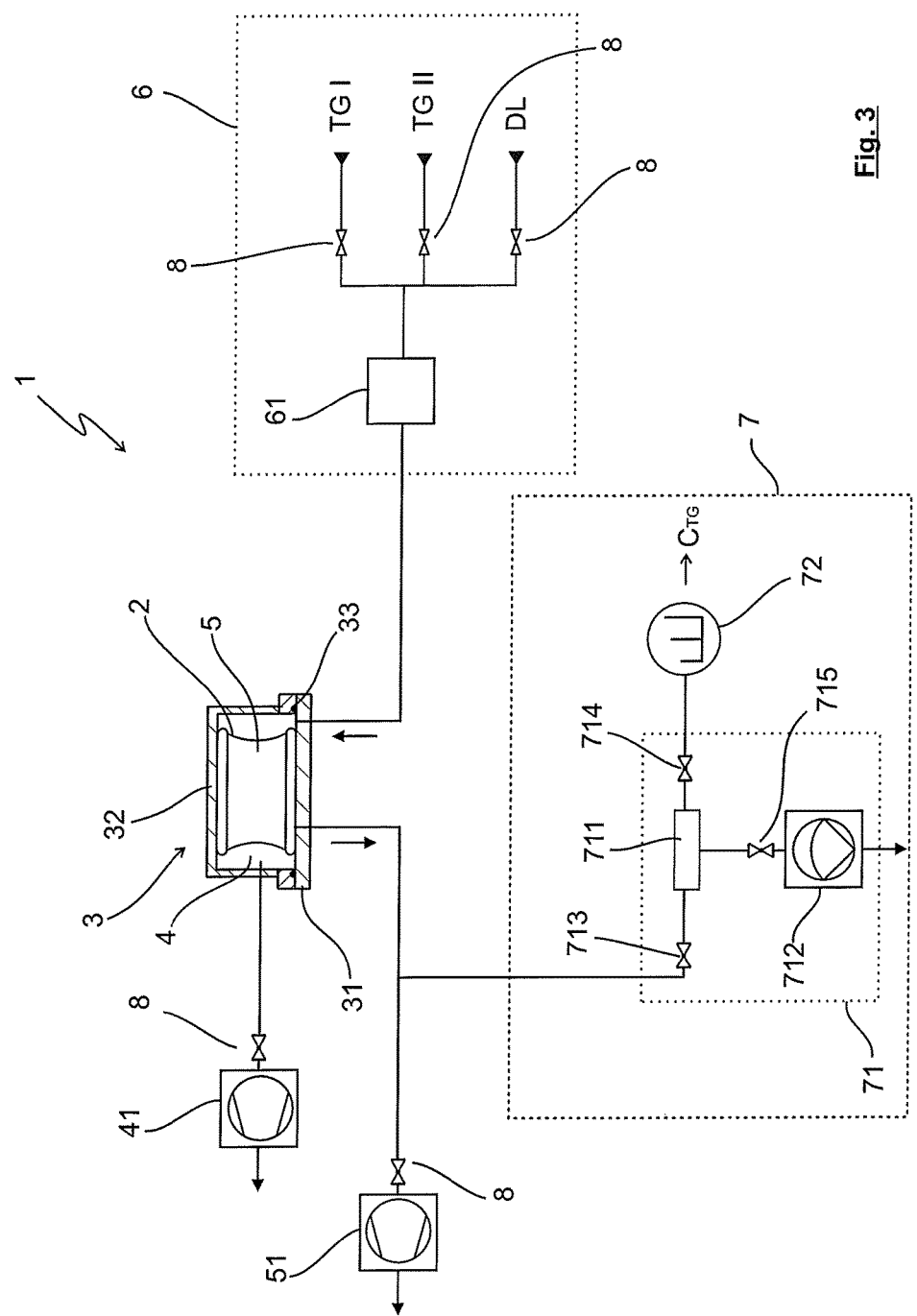
FIG. 3 is a schematic representation of a further embodiment of the inventive leak test arrangement using as an example an aluminum wheel.

FIG. 3 is a schematic representation of a further embodiment of the inventive leak test arrangement 1 is illustrated the example of a wheel 2 of aluminum.

As to the basic structure, reference is made to FIG. 1.

The test gas measurement arrangement 7 has a sample stage 71, as well as a sensor system, in this embodiment, a quadrupole mass spectrometer 72.

The sample stage 71 is composed of an intermediate chamber 711 and a vacuum arrangement, in particular a diaphragm pump 712, which evacuates the intermediate chamber 711 up to a high vacuum. For this purpose a testing space-side valve 713 and a sensor system-side valve 714 are further provided, which close off the intermediate chamber 711 relative to the quadrupole mass spectrometer 72 on the one hand and the test chamber 5 on the other hand, while the intermediate chamber 711 is evacuated.

For leak testing of the automobile wheel rim 2 to be tested for tightness, which is located in the test chamber 3, initially after the introduction of the Smart Car wheel 2 in the test chamber 3 and the closing of the test chamber 3 there is an evacuation of the test gas space 4 by the test gas space vacuum arrangement 41 and the testing space 5 by the testing space vacuum arrangement 51. The evacuation of the spaces continues up to approximately into the region of $10^{-1}$ mbar. Following the evacuation, a first test gas TG I is introduced in combination with compressed air DL in the test gas space 4 through the test gas supply 6.

Next there is the drawing of a sample from the test chamber 5, which is conveyed to the intermediate chamber 711 by the briefly opening and then closing of the test chamber-side valve 713, while the vacuum arrangement-side valve 715 is closed. This occurs by differential pressure transfer, since in the vacuum in the intermediate chamber is lower by a factor of 100 to 1,000 than the vacuum in the test chamber 5.

Now that the pressure in the intermediate chamber 711 has increased slightly, due to the introduction of the gas sample from the testing space, now the sample from the test chamber 5, which is unchanged in the gas composition, can be supplied to the quadrupole mass spectrometer 72 for analysis by opening the sensor system/quadrupole mass spectrometer-side valve 714, whereby the transmission is carried out also here on the basis of the pressure difference, as the prevailing pressure in the region of the sensor system 72 is again lower than the pressure of the intermediate chamber.

And once again it is not the entire contents of the intermediate chamber 711 that are transferred to the sensor system area, but rather only a fraction of the gas sample is transferred to the sensor system 72 by briefly opening and subsequently closing of the sensor system-side valve 714, which again does not change its composition.

The quadrupole mass spectrometer 72 analyzes the sample from the test chamber 5 in the form of now elevated vacuum level but with the same gas composition, and outputs a result that provides the content of the test gas TG I. This measurement of the concentration, or the partial pressure, of the first test gas TG I in the sample gas of the test chamber 5 is used to determine whether some of the test gas/compressed air-gas mixture introduced with high pressure in the test gas space 4 penetrated by a leak through the Smart Car wheel 2 being tested for tightness and into the testing space 5. Thus the result is obtained as to whether the structural component, in this case an automobile rim 2, in the area to be tested has the necessary tightness.

Based on this leak test a sorting of automobile wheel rims is carried out according to condition, "in order" if no leakage was present, and "not in order", if there has been a leak.

To avoid unnecessary delays, caused by a leakage of a Smart Car wheel 2 and bringing about thereby test gas contamination with the first test gas TG I within the test chamber 3, or to avoid flushing the test chamber 3, it is possible after a wheel change to correspondingly switch to a second test gas TG II and to carry out the next leak test immediately following the wheel change.

In particular, it is also possible, prior to supplying the test gas into the test gas space 4, to draw a sample from the testing space 5 using the sample stage 71 and the sensor system 72 to process this, wherein the analysis would indicate a contamination of the test chamber 5 with the test gas TG I, so that immediately, before the start of mixing of the test gas, a switchover could be made to another test gas TG II. In this way, measurement errors caused by a test gas contamination can be effectively prevented.

FIGS. 4 and 5 are a schematic representation of an embodiment and principle of application of the leak test arrangement according to the invention using the example of a drum, to be tested for leaks together with a lid associated with the specific drum, wherein drums are first filled with different test gases (FIG. 4) and then leak tested (FIG. 5), wherein the supplying of the drums to the plant is a function of a possible contamination; and FIGS. 4 and 5 are a schematic representation of a further embodiment and principle of application of the leak test arrangement 1' according invention using barrels 2" in this example, which together with a cover 21" associated with a specific barrel 2" is to be tested for tightness, wherein the barrels 2" are initially filled with different test gases TG I, TG II filled (FIG. 4) and then checked for leaks (FIG. 5), with the barrels 2"* are supplied to a plant as a function of a possible contamination of the system. The actual leak test arrangement 1 is for this purpose split into two sections, as shown in FIGS. 4 and 5, in order in this way to check a product, such as a transport drum 2"* with a correspondingly associated drum cover 21' in the final condition, i.e., when closed with the specific drum cover 21', for leaks.

In FIG. 4 for this the barrel 2" is accordingly evacuated and then filled with compressed air DL and/or test gas TG I, TG II and after filling is closed with the drum cover 21' associated the barrel 2" (2"*).

The thus prepared drum 2"* is then accordingly tested in the test chamber 3 for leaks. Reference is made to the previous embodiments.

The filling of the object to be tested for leaks with compressed air DL, and/or the test gas TG I, TG II can also take place in a special atmosphere, so that the object is filled in a special chamber correspondingly with compressed air DL and/or quasi filled with the test gas TG I, TG II and then sealed there.

For the purposes of this document, drug packaging and the like are also considered as closed packages 2", 2"* in the sense of the object to be tested for leaks. Such pharmaceutical packaging, such as blister or welding packages, spray bottles or long-term drug packaging can during filling with the drug additionally be filled with compressed air DL and/or test gas TG I, TG II and be checked for leaks after closing or sealing. In this way, a long or longer durability can be guaranteed. Likewise, filling the interior of the packaged solely with a test gas makes possible a later testing of samples for leaks.

Furthermore, pacemakers and other closed components to be tested for tightness before use, energy sources and equipment are correspondingly tested for leaks. In this manner, the tightness of the device, for example, a pacemaker to be installed in the human body, can be guaranteed.

For the leak test of medical equipment or pharmaceutical packaging test gases must of course be used that are innocuous for the body and the devices or drugs, so that no damage caused by the test gas can emerge during the later use.

In the sense of a structural component 2 or a closed packaging, a closed object or component 2", 2"*, refrigeration lines, pressure and vacuum lines, heat exchangers, such as radiators and the like, pump housings, shock absorbers and struts and dampers, fuel tanks, valves, motors, fittings, bulbs and the like and aviation components are included, so that the method can be applied also to these elements or arrangements.

The sensor arrangement of the sensor system of the test gas measuring arrangement 72 consists in this embodiment of two separate sensors, a first sensor 721 for the first test gas TG I and a second sensor 722 for the second test gas TG II.

According to the invention these two sensors 721 and 722 can be operated either simultaneously to determine or detect a possible contamination in the background, or can be controlled individually, which can be achieved through the valves 8.

Next, the type of manipulation and filling of the drums to be tested for leaks, packages or closed objects 2", 2"* are different. In this embodiment, some of the objects 2", 2"* are intentionally filled with the second test gas TG II from the outset so that initially objects 2", 2"* filled with the first test gas TG I are checked for leaks.

Then, when a possible contamination occurs, a switchover to an object 2", 2"* filled with a second gas can be made so that the tightness test can be continued. Once the contamination has disappeared, testing can again be resumed with objects 2", 2"* filled with the first test gas TG I. It makes sense to fill more barrels with the first low-cost test gas TG I than with the more expensive test gas TG II.

In FIG. 6 a schematic illustration of a further embodiment and principle of application of the leak test arrangement of the present invention is shown using a cooler or heat exchanger as example.

A cooler 2' as a structural component or as a closed object is tested for leaks. Here, the test gas pressure air supply is connected to one of the inlet or outlet connection and the other inlet or outlet connection is hermetically sealed or is connected to the vacuum line of the test gas space vacuum arrangement 41. Now the inside of the cooler 2' forms the test gas space 4 forms and the outer area between cooler 2' and the test chamber 3 forms the testing space 5.

Of course, all the tools for sealing the structural component for the test are included in the test chamber 3.

In addition, two samples stages are 71 and 71' are connected in series for improving the pressure level in this embodiment. In particular, the special fact is again mentioned that neither impurities, dirt nor deposits can interfere with the operation and also the compositions of the sample gases at any given time are constant.

Further advantageous embodiments can also be seen from the figures themselves.

LIST OF REFERENCE NUMBERS 1 leak test arrangement
2 structural component/automobile wheel hub/aluminum rim
2' cooler
2" barrel/package/object
2"* barrel/closed package/object—filled with test gas
21" barrel lid
3 test chamber
31 lower sealing plate
32 upper sealing sleeve
33 seal
4 test gas space
41 test gas space vacuum arrangement
5 testing space
51 testing space vacuum arrangement
6 test gas supply
61 TG/DL-gas mixing arrangement
7 test gas measuring arrangement
71, 71' sample stage
711, 711' intermediate chamber
712, 712' vacuum arrangement, diaphragm pump
713, 713' testing space-side valve
714, 714' sensor system/quadrupole mass spectrometer-side valve
715, 715' vacuum arrangement-side valve
72 sensor system/quadrupole mass spectrometer
721 first sensor
722 second sensor
8 controllable valve
CTG concentration test gas
DL compressed air
TG I first test gas, He
TG II second test gas, CO2

The invention claimed is:

1. A leak test method for sequentially performing successive tests of a plurality of structural components (2) or packages/objects (2"+21", 2"*) having a wall to be tested for tightness with the leak test arrangement (1), the leak test arrangement (1) comprising:
a test chamber (3), adapted to receive the structural component (2) or the packaging/object (2"+21", 2"*) during the leak test, forming
a test gas space (4) on a first side of the wall of the structural component (2) or the packaging/object (2"+21", 2"*) and the test chamber (3) or which corresponds to the interior of the package/of the object (2", 2"*), and
a testing space (5) on a second side of the wall of the structural component (2) and the test chamber (3) or between the wall of the package/object (2"+21", 2"*) and the test chamber (3);
a test gas supply (6) for supplying compressed air (DL), a preferred test gas (TG I) and a replacement test gas (TG II) into the testing space (5), wherein a mixing arrangement (61) is provided upstream of the test gas space (4) for mixing the test gases (TG I, TG II) with compressed air (DL), wherein the test gas supply (6) comprises at least first, second and third individual introduction means, which extend directly into the test gas space (4) or are located there, wherein the first introduction means is charged with the compressed air (DL), the second introduction means is charged with the first test gas (TG I) and the third introduction means is charged with the second test gas (TG II);
a test gas measuring arrangement (7) with a sensor system (72, 721, 722) comprising a mass spectrometer, a quadrupole mass spectrometer (72) and/or at least two single test gas sensors (721, 722), adapted for sensing the preferred test gas (TG I) and the replacement test gas (TG II) in the testing space (5); and
a testing space vacuum arrangement (51) for evacuating the testing space (5);
the method comprising:
introducing the preferred test gas (TG I) into the test gas space (4) and using the sensor system (72, 721, 722) to sense a for the preferred test gas (TG I) in the testing space (5) to check for leaks, wherein:
a) upon detection of the preferred test gas (TG I) in the testing space (5) the tested structural component (2) or packaging/object (2"+21", 2"*) is evaluated as having a leak (NIO);
or
b) in the absence of detection of the preferred test gas (TG I) in the testing space (5) the tested structural component (2) or packaging/object (2"+21", 2"*) is evaluated as having no leak (IO);
wherein
in time overlap with, before and/or after the leak check, sensing the testing space (5) for contamination by the preferred test gas (TG I) and, in the event of sensing contamination of the testing space (5), switching over the mixing arrangement (61) from the second introduction means to the third introduction means so that a switchover is made from the preferred test gas (TG I) to the replacement gas test (TG II) for the next leakage test measurement to be performed.

2. The leak test method according to claim 1, wherein
in time overlap with, before and/or after the leak test, a detection/evaluation of contamination of the testing space (5) by the preferred test gas (TG I) is carried out, and that upon determination there is no longer contamination of the testing space (5) a switch is made from the replacement test gas (TG II) back to the preferred test gas (TG I) for the next leak test measurement.

3. The leak test method according to claim 1,
wherein
in time overlap with, before and/or after the leak test a detection/evaluation of contamination of the testing space (5) by the replacement test gas (TG II) is carried out and, in the event of contamination of the testing space (5) or determination of a leak, a flushing of the testing space (5) and/or of the test chamber (3) with air is carried out and the preferred test gas (TG I) is used in the next leak test to be performed.

4. The leak test method according to claim 1,
wherein
the test gas measuring arrangement (7) includes a sample stage (71) between the testing space (5) and the sensor system (72) with
an intermediate chamber (711),
a valve (713) arranged on the testing space-side between the intermediate chamber (711) and the testing space (5),
a valve (714) arranged on the sensor system-side between the intermediate chamber (711) and the sensor system (72),
a vacuum arrangement (712) connected to the intermediate chamber (711) for evacuating the intermediate chamber (711)
and
a vacuum arrangement-side valve (715) arranged between the intermediate chamber (711) and the vacuum arrangement (712),
wherein the leak test method further comprises the steps of:
1) evacuating the intermediate chamber (711) while the testing space-side valve (713) and sensor-side valve (714) are closed via the vacuum arrangement (712) with open vacuum arrangement-side valve (715),
wherein in time overlap the following occurs:
2A) in the case of a leak test of a wall of a structural component (2):
  a) positioning the structural component (2) while the test chamber (3) is open;
  b) closing the test chamber (3) and sealing the structural component (2), so that a test gas space (4) and a testing space (5) are formed;
  c) evacuating the testing space (5) and the test gas space (4);
  d) mixing and introducing a mixed gas comprising compressed air (DL) and/or a test gas (TG I, TG II) into the test gas space (4);
or
2B) in the case of leak testing a closed packaging/a closed object (2"+21", 2"*):
  a) preparing the test gas space (4) by filling the internal space of the closed package/object (2"+21", 2"*) as a test gas space (4) with compressed air (DL) and/or the test gas (TG I, II TG)
  b) positioning the closed and with compressed air (DL) and/or test Gas (TG I, TG II) filled packaging/object (21"*) in the open test chamber (3);
  c) closing the test chamber (3), so that a testing space (5) is formed;
  d) evacuating the testing space (5);
3) closing the vacuum arrangement-side valve (715) and subsequently drawing a sample from the testing space (5) by the pressure drop of a portion of the gas sample by briefly opening and then closing the testing space-side valve (713);

4) a) releasing of part of the or in the intermediate chamber (711) located gas sample of the testing space (5) to the sensor system (72) via a pressure drop by opening the sensor system-side valve (714) while analyzing the gas sample by the sensor system (72) and evaluating the tightness of the structural component (2) or the closed package/object (2"+21", 2"*);
and
b) in time overlap venting the test chamber (3) for readying for the next structural component (2) by removing the structural component (2) or the closed package/object (2"+21", 2"*).

5. The leak test method according to claim 4,
wherein
prior to the step 2A) d) or 2B) a), a detection of the testing space (5) or the test chamber (3) as to contamination with a test gas (TG I/TG II) takes place.

6. The leak test method according to claim 4,
wherein
after the step 2A) c) or 2B) d), an initial closing the vacuum arrangement-side valve (715) and subsequently drawing a sample from the testing space (5) by briefly opening and then closing the testing space-side valve (713) is carried out [Step 3],
wherein
subsequently by releasing a portion of or the gas sample located in the intermediate chamber (711) of the testing space (5) to the sensor system (72) via a pressure drop by opening the sensor system-side valve (714) [Step 4) a)] a gas analysis of a gas sample from the testing space (5) is examined by the sensor system (72) for contamination with the test gas (TG I) from the previously conducted leak test,
wherein
in the case of the detection of contamination of the testing space (5) with the first test gas (TG I) a switchover of the test gas supply (6) to a second test gas (TG II) or a combination of the first and second test gas (TG I+TG II) occurs,
wherein after the switchover of the test gas (TG I to TG II) detection of the first test gas (TG I) continues, wherein, upon falling below a contamination limit of the first test gas (TG I), a switchback is made to the first test gas (TG I).

7. The leak test method according to claim 4,
wherein
after the step 2A) c) or 2B) d) initially a closing the vacuum arrangement-side valve (715) and then a drawing of a sample from the testing space (5) by briefly opening and then closing the testing space-side valve (713) is carried out [Step 3],
wherein
subsequently by releasing a portion of or the gas sample located in the intermediate chamber (711) of the testing space (5) to the sensor system (72) via a pressure drop from opening the sensor system-side valve (714) [Step 4) a)] a gas analysis of a gas sample from the testing space (5) is examined by the sensor system (72) for contamination with the test gas (TG I) from the previously conducted leak test,
wherein
in the case of the detection of contamination of the testing space (5) with the first test gas (TG I) a change of the tested sealed packages/objects (2"+21", 2"*) occurs, each filled with a second test gas (TG II), or a combination (I+TG TG II) from the first and second test gas, wherein after the change of closed packaging/the closed object (2"+21", 2"*) detection of the first test gas (TG I) continues to be conducted, wherein when this falls below a contamination limit of the first test gas (TG I), closed packaging/closed objects (2"+21", 2"*) with the first test gas (TG I) are again supplied to the test.

8. A leak test method for sequentially performing successive tests of a plurality of structural components (2) or packages/objects (2"+21", 2"*) having a wall to be tested for tightness with the leak test arrangement (1), the leak test arrangement (1) comprising:

a test chamber (3), adapted to receive the structural component (2) or the packaging/object (2"+21", 2"*) during the leak test, forming a test gas space (4) on a first side of the wall of the structural component (2) or the packaging/object (2"+21", 2"*) and the test chamber (3) or which corresponds to the interior of the package/of the object (2", 2"*), and a testing space (5) on a second side of the wall of the structural component (2) and the test chamber (3) or between the wall of the package/object (2"+21", 2"*) and the test chamber (3);

a test gas supply (6) for supplying compressed air (DL), a preferred test gas (TG I) and a replacement test gas (TG II) into the testing space (5), wherein a mixing arrangement (61) is provided upstream of the test gas space (4) for mixing the test gases (TG I, TG II) with compressed air (DL), wherein the test gas supply (6) comprises at least first, second and third individual introduction means, which extend directly into the test gas space (4) or are located there, wherein the first introduction means is charged with the compressed air (DL), the second introduction means is charged with the first test gas (TG I) and the third introduction means is charged with the second test gas (TG II);

a test gas measuring arrangement (7) with a sensor system (72, 721, 722) comprising a mass spectrometer, a quadrupole mass spectrometer (72) and/or at least two single test gas sensors (721, 722), adapted for sensing the preferred test gas (TG I) and the replacement test gas (TG II) in the testing space (5); and a testing space vacuum arrangement (51) for evacuating the testing space (5);

the method comprising:

introducing the preferred test gas (TG I) into the test gas space (4) and using the sensor system (72, 721, 722) to sense for the preferred test gas (TG I) in the testing space (5) to check for leaks, wherein:

a) upon detection of the preferred test gas (TG I) in the testing space (5) the tested structural component (2) or packaging/object (2"+21", 2"*) is evaluated as having a leak (NIO);

or b) in the absence of detection of the preferred test gas (TG I) in the testing space (5) the tested structural component (2) or packaging/object (2"+21", 2"*) is evaluated as having no leak (IO); and wherein before the leak check, sensing the testing space (5) for contamination by the preferred test gas (TG I) and, in the event of sensing contamination of the testing space (5), switching over the mixing arrangement (61) from the second introduction means to the third introduction means so that a switchover is made from the preferred test gas (TG I) to the replacement gas test (TG II) for the next leakage test measurement to be performed.

* * * * *